Nov. 4, 1952     R. G. S. ADAM     2,616,144
SOIL BLOCK MOLDING MACHINE
Filed July 27, 1950     2 SHEETS—SHEET 1
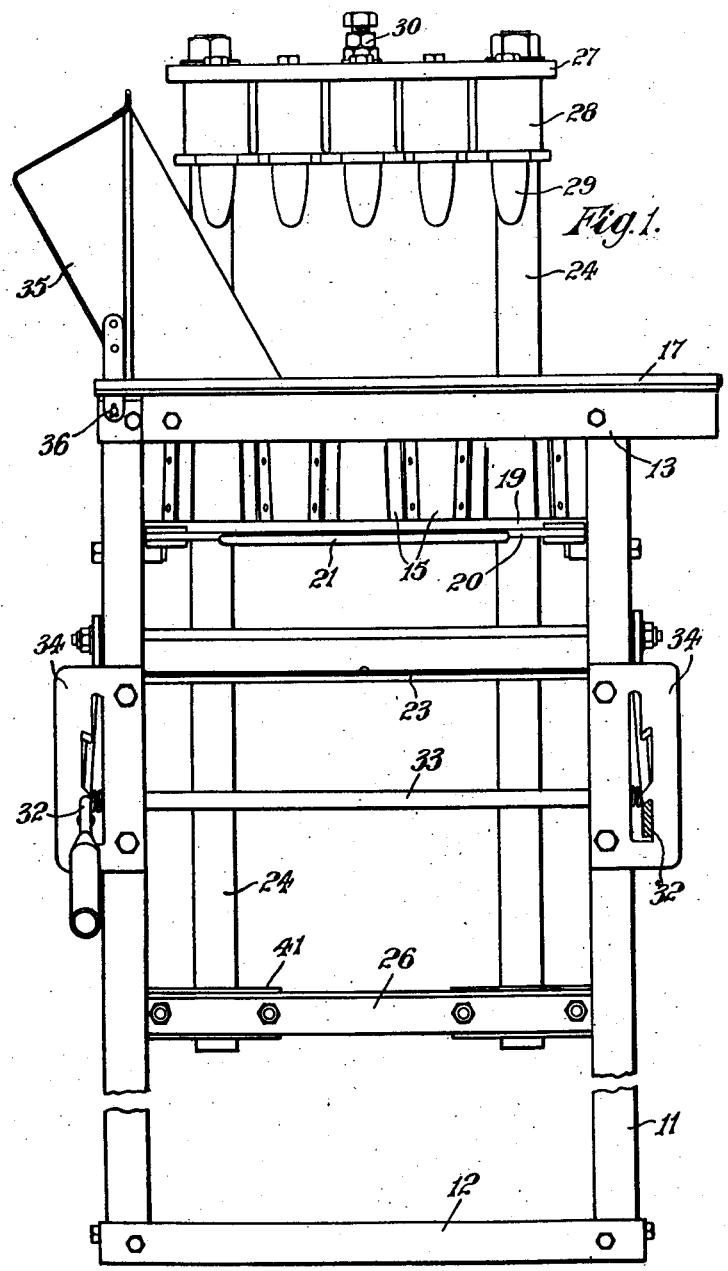
Robert Gordon Stewart Adam, INVENTOR

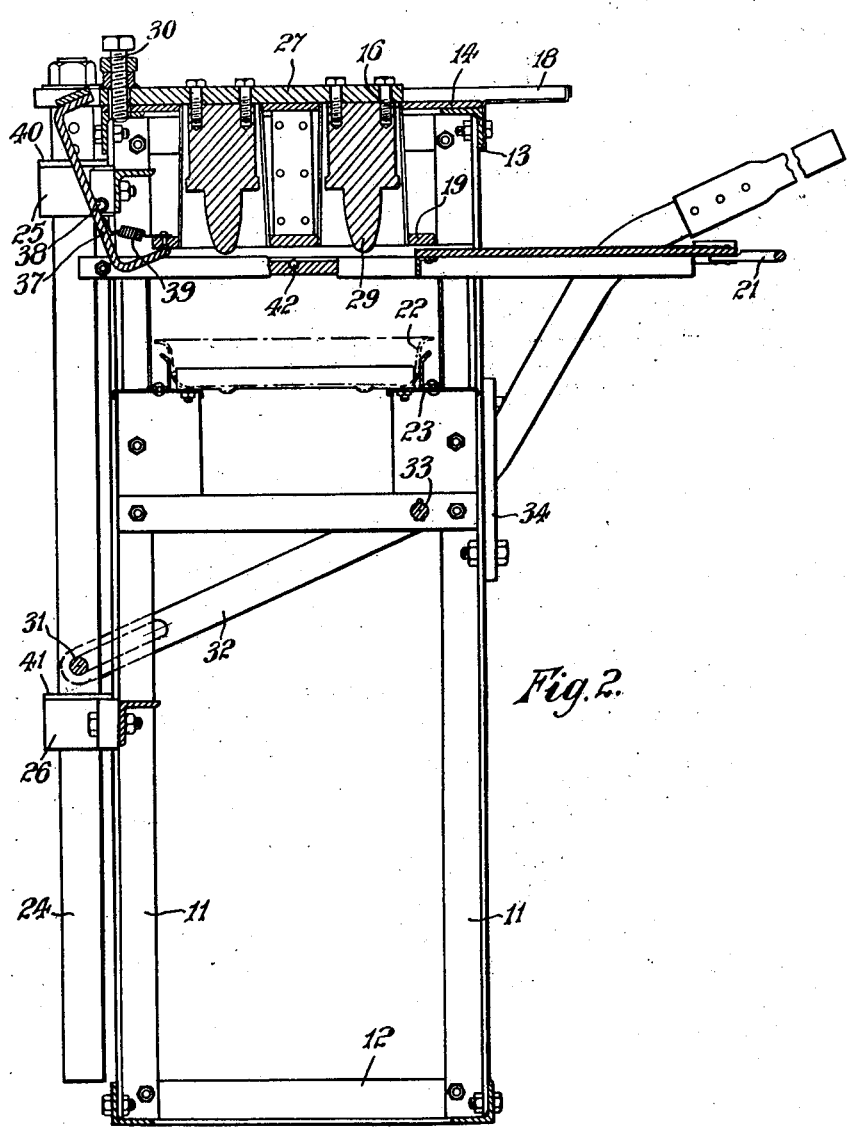

Patented Nov. 4, 1952

2,616,144

UNITED STATES PATENT OFFICE 2,616,144

SOIL BLOCK MOLDING MACHINE

Robert Gordon Stewart Adam, London, England

Application July 27, 1950, Serial No. 176,173
In Great Britain August 2, 1949

1 Claim. (Cl. 25—87)

At the present time an enormous number of flower-pots are used annually by nurserymen and market gardeners and it is necessary for such flower-pots to be replaced in large numbers annually on account of the heavy loss by breakage.

The object of the present invention is to enable commercial growers to save the very considerable expense to which they are put to maintain an adequate supply of flower-pots, by providing a machine which will compress soil into self-supporting blocks, which will stand up for long periods to all normal handling. Such soil blocks serve for potting seeds or seedlings which can be planted out when ready, thus eliminating root disturbance.

According to the present invention, a machine for producing self-supporting soil blocks comprises one or a plurality of open-ended canisters or pots supported on a removable plate, soil being supplied to said canisters and compressed therein, preferably with a central depression for reception of a seed or seedling, by means of one or a plurality of rams or dies. After the blocks have been formed the supporting plate is removed and the blocks allowed to fall to a receiving tray, whence they can be collected for use.

The soil may be supplied from a hopper so arranged as to supply the correct amount of soil to each canister for production of the requisite block. Preferably the canisters are supported by the removable plate on a framework beneath an upper platform to which the soil is supplied, the framework including guides for a slidable pressure plate carrying a plurality of rams, each ram including a dibber. The pressure plate is actuated by mechanical or hydraulic means to compress the soil in the canisters.

The canisters may be of circular, square or polygonal cross-section, the rams or dies, of course, having a similar cross-section, whilst the dibbers may simply be of uniform conical shape.

The invention will now be described in detail, reference being had to the accompanying drawings, of which, Figure 1 is a front elevation of the machine shown in the inoperative position and Figure 2 is a side elevation, partly in section, showing the machine in the operative position.

The machine comprises a framework consisting of upright angle-iron members 11, interconnected at the bottom and the top by angle-iron members 12 and 13, respectively.

The framework supports fixedly a plate 14 serving as a top plate for the slightly downwardly flaring canisters or pots 15. This plate is apertured, for example, formed with eight apertures such as 16, arranged in three staggered rows and surrounded by front and side aprons 17 and 18.

Arranged beneath and spaced from the fixed plate 14 is a platform 19 serving as the bottom plate for the canisters or pots and similarly apertured, these apertures being closed by a sliding plate 20 operable by the hand grip 21. When this sliding plate is pulled out the soil blocks formed within the canisters, as will appear, drop to a tray 22 resisting on a support 23 on the framework which tray can then be removed.

A pair of vertical columns 24 sliding in upper and lower guide blocks 25 and 26 support at their upper ends a pressure plate 27 to which are attached the compressors, rams or dies 28 each formed with a dibber extension 29, the disposition of these dies corresponding with the apertures in the top plate 14. An adjusting screw 30 controls the degree of downward movement of the compressor plate.

A bar 31 interconnecting the columns 24 engages in slots 51 formed in the operating handles 32 projecting outwardly from the front of the framework and themselves interconnected, intermediately of their lengths by a bar 33 journalled in the framework.

The handles operate in slotted and notched members 34 secured to the front uprights 11.

A hopper 35, pivoted at 36 to the framework supplies soil to the top plate 14 over which the soil is spread by hand until it drops to the canisters.

A trigger stop 37 pivoted at 38 to the framework and controlled by the spring 39 may be swung by hand to engage under the top plate 19 to prevent inadvertent operation of the machine.

The guide blocks 25 and 26 are covered on their upper surfaces with cushioning leather washers 40 and 41 respectively, whilst the action of the sliding plate 20 is assisted by the ball bearing 42.

In use, the hopper is filled with soil whence it is passed to the top plate and so to the canisters, the sliding plate being in the closed position. The adjusting screw is set and then the handles released from the notched members and the compressor plate actuated. When the soil has been compressed into compact blocks, the compressor plate is raised, the sliding plate pulled out and the blocks allowed to fall on to the tray for removal.

I claim:

A machine for producing self-supporting soil blocks comprising a framework, spaced upper and lower apertured plates secured to said framework, a plurality of upwardly convergent open ended pots supported by and between said plates and in register with the apertures therein, a sliding plate arranged closely beneath the lower apertured plate, a removable tray supported by said framework at a distance at least as great as the depth of the blocks beneath said sliding plate, a compression plate, compression rams carried by said plate in register with the apertures in the upper apertured plate, dibbers formed on each compression ram, means to thrust said compression rams into said pots, and adjustable means for limiting the movement of said rams.

ROBERT GORDON STEWART ADAM.

REFERENCES CITED

The following references are of record in the file of this patent:

UNITED STATES PATENTS

| Number | Name | Date |
|---|---|---|
| 1,057,029 | Bartlett | Mar. 25, 1913 |
| 2,381,272 | Fischer | Aug. 7, 1945 |
| 2,441,177 | Wong | May 11, 1948 |